INVENTORS
WILLIAM M. OWENS, JR.
BY Cushman, Darby & Cushman
ATTORNEYS

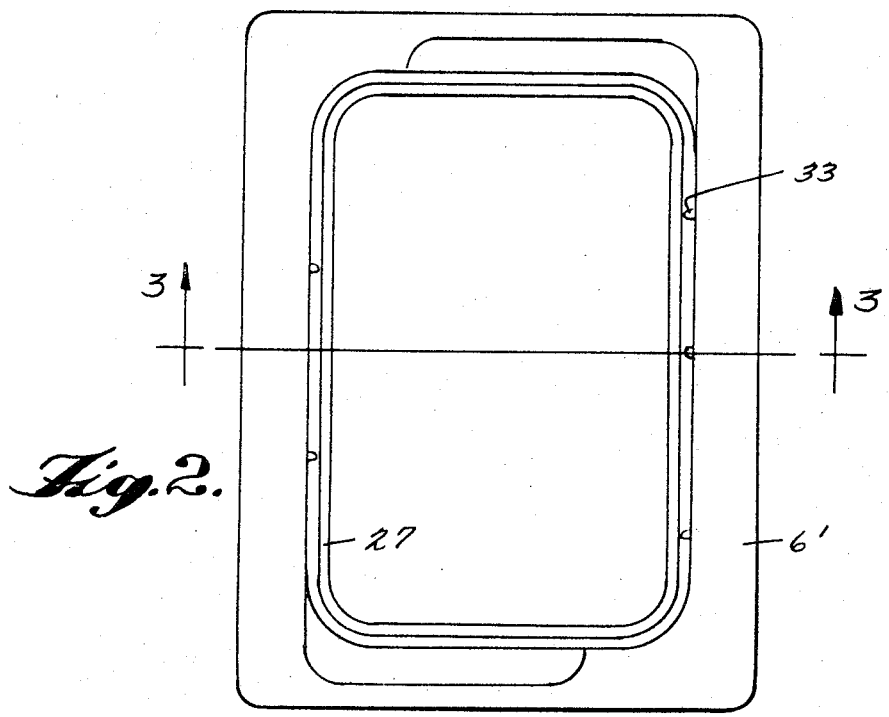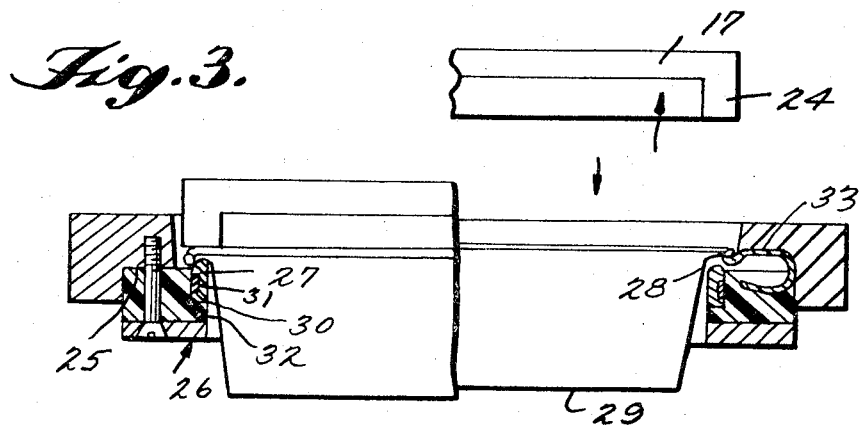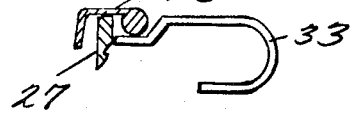

July 1, 1969  W. M. OWENS, JR  3,452,513
HEATER CONSTRUCTION FOR CLOSING PACKAGES
Filed Jan. 10, 1966  Sheet 3 of 3

INVENTORS
WILLIAM M. OWENS, JR.
BY Cushman, Darby & Cushman
ATTORNEYS

# United States Patent Office 3,452,513
Patented July 1, 1969

3,452,513
HEATER CONSTRUCTION FOR
CLOSING PACKAGES
William M. Owens, Jr., 298 Roswell St.,
Smyrna, Ga. 30080
Filed Jan. 10, 1966, Ser. No. 519,707
Int. Cl. B65b 51/14, 7/28; B67b 5/02
U.S. Cl. 53—329                 1 Claim

ABSTRACT OF THE DISCLOSURE

Apparatus for heat sealing packages of the type comprising a lid and a receptacle having a bottom, a side wall inclined upwardly and outwardly from the bottom and a flange extending outwardly from the top of the side wall and terminating in an enlarged bead. The invention is particularly useful when the receptacle is aluminum foil. Heat sealing is accomplished by pressing the flange against an annular heated member in a conveyor which moves the package between stations in a packaging machine. The flange is elevated above the heated member by a resilient spring extending inwardly toward the heated member and having a recess to receive the bead. The recess aligns the package in relation to the annular heated member. As the package is elevated by the resilient member the inclined side wall is moved away from the heated member so that the contents of the package are not prematurely heated by the heating member.

---

This invention relates to apparatus for closing packages by heat sealing, and more particularly by supplying an impulse of heat.

Heat sealing is a process by which two layers are sealed together by application of heat. As used herein, the term heat sealing includes formation of a seal by heating layers of thermoplastic material and pressing them together. It also includes heating an adhesive which is activated by heat in pressing the layers togethre.

The invention is particularly concerned with closing packages by heat sealing a metal foil cup and a lid. For example, the cup may have a bottom, sides and a lateral flange, extending outwardly from the tops of the sides for sealing to the lids. An apparatus for continuous closing of packages of this type is disclosed in Allen et al. application, Ser. No. 499,896, filed Oct. 21, 1965, which includes means for replacing air in the package with another gas such as carbon dioxide and a heat sealing press which is lowered onto the outer edges of the lid against the flange of the cup and applies heat from above. In that apparatus, the cups are placed in openings in a moving table and the flanges are supported from below by the table. Each of the cups is indexed to a position below the heating press, and the press is lowered briefly.

When aluminum foil cups are used, it was found that the heat seal was not entirely satisfactory. Upon investigation it was determined that the seal was not formed as well as in, say, plastic cups because the aluminum foil cups were heat conductive and heat was dissipated rapidly from the flanges when applied by the press. Several possible remedies were considered, including increasing the heating time, and changing the heat sealing material to lower the heat seal temperature. However, none of these was entirely satisfactory. For example, increasing the heating time slowed the operation of the entire apparatus and increased the risk of heating the product in the package. The latter would be especially undesirable in packaging, for example, sliced luncheon meat or weiners which would be affected by the heat.

It has been found in accordance with one aspect of the present invention that this difficulty can be overcome if heat is applied directly to the flange of the cups at the same time as the lid is heated. Since heat transfer into the cup is governed by the laws of conduction, heat is only transmitted from the heating press to the cup in proportion to the temperature gradient. By separately heating the cup flange, the heat supplied by the overheated heating press is not dissipated into the cup.

It will be recognized that this discovery could not be put into practical use immediately because of the need to avoid any substantial heating of the rest of the cup and especially of its contents. In the aforesaid gas flushing and package closing apparatus, the package may be held in the table for approximately ten seconds or longer. If heat were supplied continuously, the package would receive too much heat. Therefore, to apply this discovery, it was necessary to provide means for supplying heat to the flanges of the cup only when the seal was being formed, in synchronism with the heating press, and to limit the amount of heat applied and the duration of the heating. In addition, because of the means used to move the cups, any heater which contacts the packages preferably should be a part of the moving conveyor. Since the conveyor provides means for holding several cups at a time, duplicate heating means were required if heating was by conduction, and therefore the cost of the heating mechanism had to be considered.

Various impulse heating techniques were evaluated, including dielectric heating, supplying a pulse of electric power to an electric heater and other means for instantaneous heat generation, but these were rejected as inadequate for a continuous packaging operation. It was found, for example, that heat could not be generated and applied sufficiently rapidly to produce a short pulse of heat synchronized with operation of the overhead heating press.

In accordance with the present invention, the foregoing difficulties are overcome by a heat source below the cup flange and resilient means which normally elevates the package. When the package is closed by the heating press, the lifting ability of the resilient means is overcome and the package is lowered toward and into contact with the heat source. This causes the flange of the package to be heated for an instant until the heating press is raised and the package also is lifted by the resilient means. It is possible to supply all or a portion of the heat required for heat sealing from this heat source. The amount of heat supplied is controlled by the size and temperature of the heat source and the heat capacities and thermal conductivity coefficients of the heat source, the cup and the lid. However, it is preferred to supply a portion of the heat from the heat source and a portion from the press.

For a more complete explanation of the principles of the invention, there will now be described in detail a preferred embodiment, reference being made to the drawings in which:

FIGURE 2 is a plan view of a package-receiving mandrel for use in the apparatus of FIGURE 1;

FIGURE 3 is a cross section of a mandrel along lines 3—3 of FIGURE 2, the right side of the figure showing the cup elevated above the heat source and the left side of the figure showing the cup lowered, a heating press being shown schematically;

FIGURE 4 shows another embodiment of a spring for elevating the cup;

Figure 1:
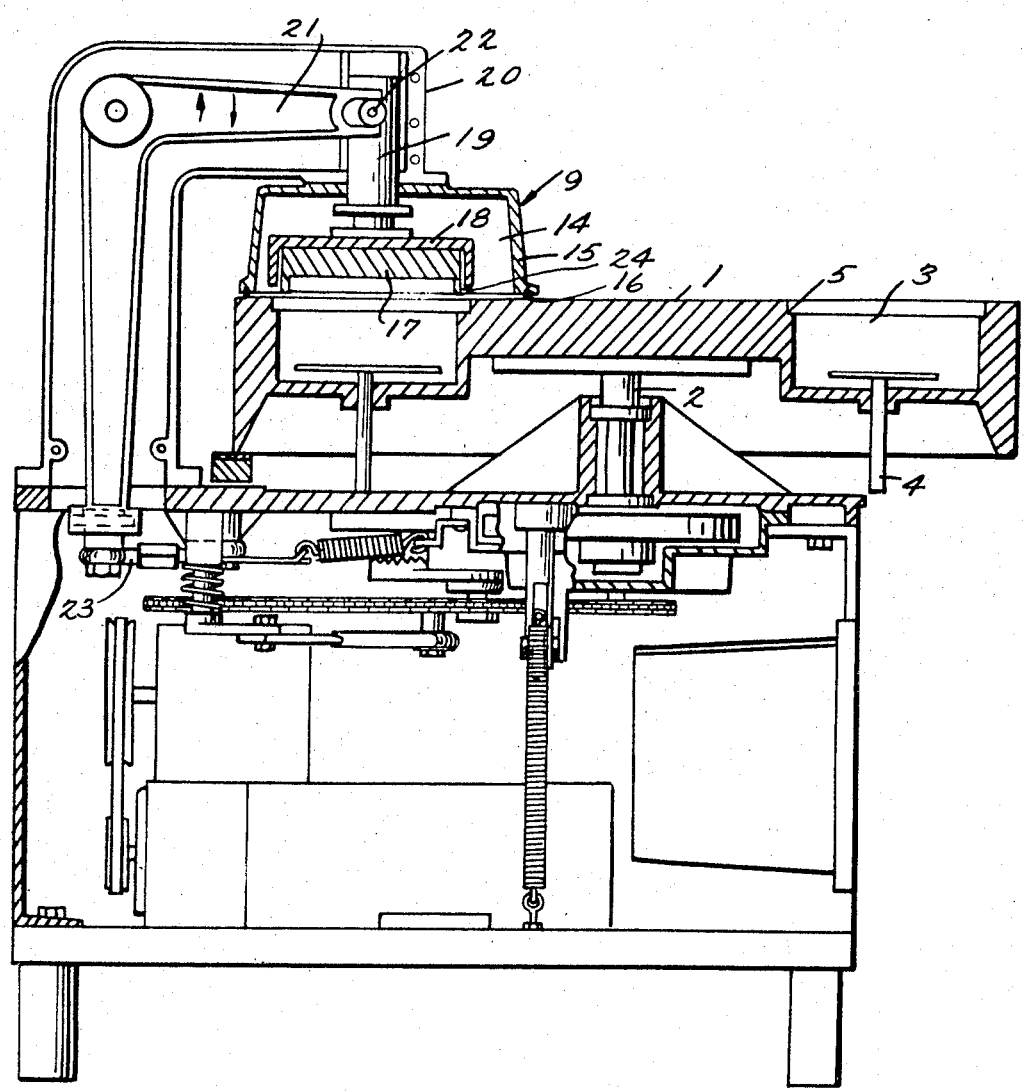
FIGURE 1 is a vertical cross section through a machine of the type described in the aforesaid Allen application which may incorporate the present invention, some parts being omitted for clarity.

The apparatus shown in FIGURE 1 is fully described in the aforesaid Allen et al. application, the disclosure of which is incorporated herein by reference. Briefly, it comprises a table 1 which rotates about a vertical axis on a shaft 2. The table has a plurality of open top chambers 3 which receive packages, each of which is equipped with a vertically reciprocating rod 4 to elevate packages for ejection after they are sealed.

Figure 5:
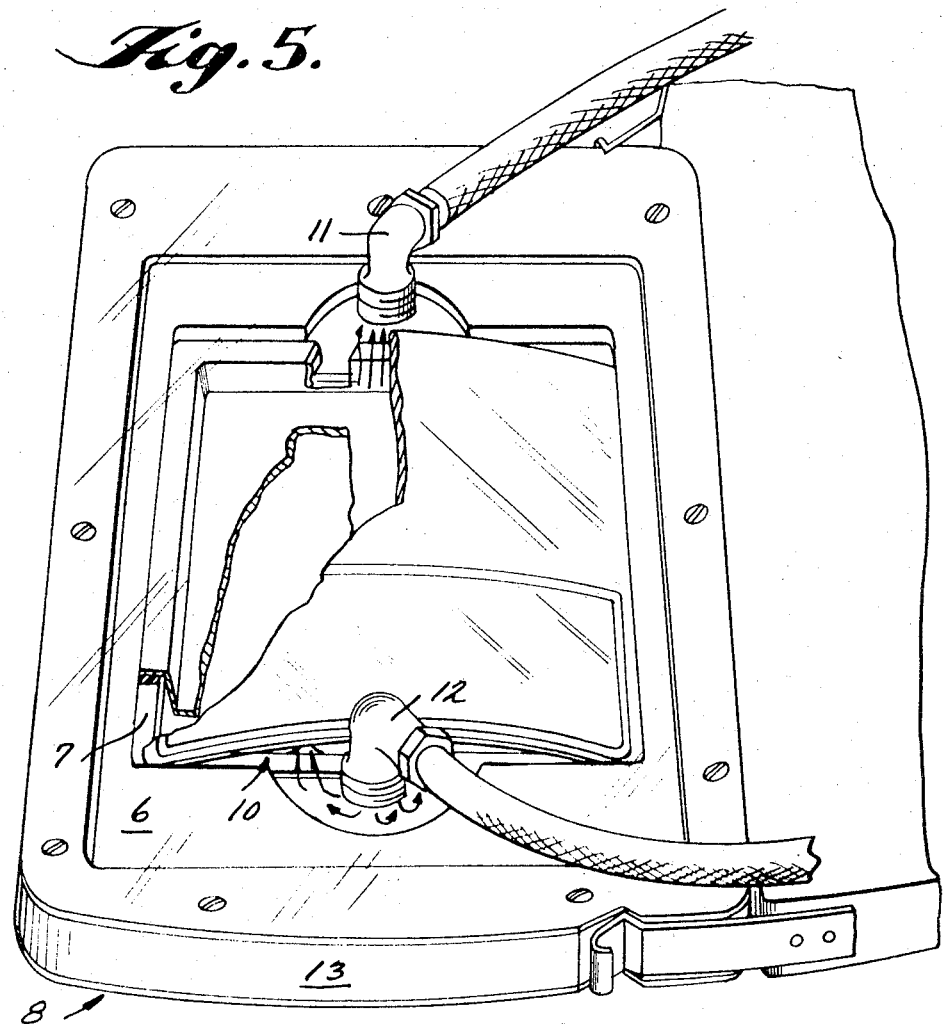
FIGURE 5 is a perspective view showing the gas flushing portion of the apparatus of FIGURE 1.
Figure 6:
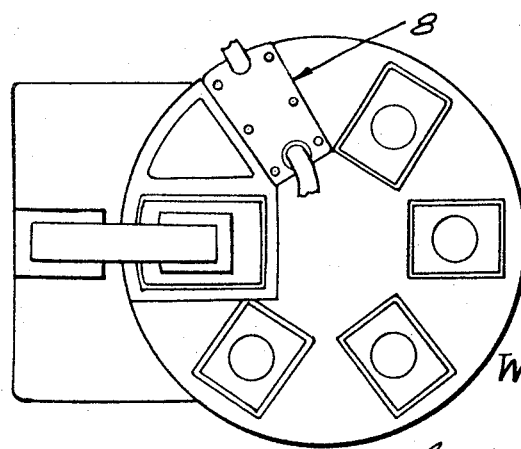
FIGURE 6 is a plan view of the apparatus of FIGURE 1.

The upper edge of each chamber 3 is recessed to provide a ledge 5 which receives a mandrel 6 of the types shown in FIGURES 2 and 5. The mandrel is a plate which has a central opening to receive the package and a ledge 7 around the opening which supports the package flange below the top of the mandrel. The apparatus may be supplied with several sets of interchangeable mandrels which are shaped to accept a variety of packages, some of which may be equipped with a heating mechanism of the present invention and others from which it is omitted.

For purposes of illustration, FIGURE 2 shows a mandrel designed for rectangular cups and lids having about the same dimensions as the cup and a tab projecting beyond one corner of the cup for assistance in opening the package. However, it will be appreciated that mandrels may be provided for square, circular and other shapes of cups.

The table is moved intermittently to index the mandrels to several stations at which a plurality of operations are performed on the cups. At one station, the cups are inserted, at the next, lids are placed over the cups by an automatic lid dispenser. A third station is within a gas flushing chamber indicated generally by 8 in FIGURE 5 where gas under pressure replaces air in the packages. A fourth station indicated generally at 9 in FIGURE 1 is for heat sealing and, at the next station, the packages are elevated and removed.

For gas flushing, the lids are bowed upwardly as shown in FIGURE 5 to form a kind of tunnel 10 between themselves and the cups. Suction is applied to a tubing connector 11 which opens downwardly toward one end of the tunnel and gas under pressure is supplied to a similar tubing connector 12 at the other end of the package so that gas flows into and through the tunnel, sweeping air before it to the suction line.

The gas flushing chamber has sides 13 which rest on the table and the cups and lids move under them because they are supported below the top of the table, i.e., on the recessed ledge 7.

At the sealing station 9, the packages are within a chamber 14 enclosed by sides 15 which form a gas tight sliding engagement with the table 1 by means of a gasket 16.

The heating press is within the chamber comprising a heating member 17, which is, e.g., electrically heated, a support 18 for the heating member and a plunger 19 which carries the support and is mounted for vertically reciprocating motion in a housing 20 at the top of chamber 14. Vertical movement is provided by a bell crank 21 pivoted in the housing and engaging a wrist pin 22 on the plunger. The lower end of the bell crank is reciprocated by a cam actuated link 23 described more completely in the aforesaid Allen et al. application.

The heating member 17 includes a depending ring shaped element 24 to fit within the opening into the mandrel 6 and align with the flanges of a package. A variety of interchangeable heating members 17 may be supplied for use with mandrels shaped to accept various packages, as described above.

In a preferred form of the invention, the heating element 24 is constructed of a heat resistant but resilient or elastomeric material such as silicone rubber or a fluorinated elastomer. It has been found that more efficient heat sealing is obtained if one of the elements pressing against the layers being sealed is resilient. The use of a heated elastomeric material provides a further advantage in that it supplies controlled heat transfer. The rubber has a relatively low co-efficient of heat conduction; when it is pressed against a cup it may transfer heat near its surface relatively quickly but further heating is limited by relatively slow heat transfer within the rubber.

In accordance with the present invention, means are provided for heating the flanges of the cups only during heat sealing. As shown in FIGURES 2 and 3, a replacement mandrel 6' is provided which is milled on its lower surface to form a seat 25 for a heater 26. The heater assembly includes a heat conducting ring-shaped element 27 which is mounted under the sealing flange 28 of a cup 29. There is a groove 30 in one side of the element 27 and an electric heating element 31 is fitted within the groove to supply heat to the heat source element. Suitable electric connections, not shown, are provided for the heating element, and thermostatic control of temperature may be included, e.g., by means of a thermocouple in the heat source and a switching device operatively connected to the thermocouple and the electric supply for the heating element. Devices of this type are well known to those skilled in the art.

The heat source is mounted in a heat insulating member 32 which is fastened against the seat 25 by screws or other means. The insulating member may be composed of a heat-resistant plastic material, e.g., a phenolic resin or other suitable material. If desired, a reinforcing plate 26 may be fastened to its lower surface as shown in FIGURE 3.

In the embodiment shown in FIGURES 2 and 3, openings are formed in the inner wall of the mandrel 6' and in the insulating material 32 to receive springs 33. These normally elevate the cups as shown in the right side of FIGURE 3. However, when the heating member 17 is lowered, the lifting effect of the spring is overcome and the package is lowered until flange 28 is on the heat source 27.

In the embodiment shown, the spring is a U-shaped member of spring wire having one end bent to form a cradle to receive the beaded edge of the cup. This arrangement is particularly desirable because it automatically aligns the cup with the heat source. That is, the opening into the mandrel 6' ordinarily will be a little larger than the cup to facilitate insertion, but it is preferable that the cup be aligned precisely with the heat source for effective heat sealing.

Five springs are shown in the drawing, but it will be appreciated that the exact number may be varied with the weight of the packages and the strength of the springs. It also will be appreciated that other types of springs or other resilient means may be used. For example, the springs may be replaced with a continuous ring of foam rubber around the mandrel.

Continuous heating of the heat source 27 avoids the problems of attempting to supply a pulse of heat by connecting an electrical heater to a power supply for an instant. At the same time, the means illustrated above separates the package from the heat source while both the package and the heat source travel with the conveyor. Because of the insulating property of the surrounding air or other gas, relatively little heat reaches the package until the heating press is lowered. Then heat is supplied to the lower surface of the flange 28 and a heat seal is formed. As soon as a sufficient quantity of heat is supplied, the press is elevated and the package again is lifted by the resilient means. Therefore, the package only receives the required amount of heat and in a very short period of time. Dissipation of heat in metal foil cups is therefore minimized, and efficient heat sealing is possible.

It will be understood that the same advantages can be obtained in other types of apparatus which differ from the apparatus disclosed in details of construction and mode of operation without departing from the scope of the invention. The foregoing description has been furnished for purposes of illustrating the invention, the scope of which is defined in the appended claims.

I claim:
1. Apparatus for closing a package of the type comprising a lid and a receptacle having a bottom, a side wall inclined upwardly and outwardly from said bottom and a flange extending outwardly from the top of said side wall, the outer edge of said flange terminating in an enlarged bead, said apparatus comprising an annular heating member which receives said receptacle and which can seal said flange to said lid when the flange contacts the heating member, means above said annular heating member for pressing said flange against said heating member and the side wall and bottom of said receptacle through said annular heating member, and resilient support means normally elevating said flange above an inclined side wall inwardly away from said annular heating member, said support means including a support member extending inwardly toward said heating member and having an upwardly opening concave recess to receive said enlarged bead, whereby the package is normally raised above said annular heating member and the inclined side wall is spaced inwardly of and away from said annular heating member to prevent overheating the contents of the package, the concave recess aligning the package centrally within said annular heating member.

References Cited

UNITED STATES PATENTS

| | | | |
|---|---|---|---|
| 2,302,846 | 11/1942 | Farmer et al. | 53—373 X |
| 3,189,505 | 6/1965 | Sloan et al. | 53—22 X |
| 3,196,590 | 7/1965 | Ollier et al. | 53—112 |
| 3,224,163 | 12/1965 | Ray | 53—373 X |

TRAVIS S. McGEHEE, *Primary Examiner.*

U.S. Cl. X.R.

53—112, 373